US011420401B2

(12) United States Patent
Michl

(10) Patent No.: US 11,420,401 B2
(45) Date of Patent: Aug. 23, 2022

(54) LAYING DIE

(71) Applicant: Cevotec GmbH, Taufkirchen b. Munich (DE)

(72) Inventor: Felix Michl, Taufkirchen b. Munich (DE)

(73) Assignee: Cevotec GmbH, Munich (DE)

( * ) Notice: Subject to any disclaimer, the term of this patent is extended or adjusted under 35 U.S.C. 154(b) by 479 days.

(21) Appl. No.: 16/492,331

(22) PCT Filed: Mar. 8, 2018

(86) PCT No.: PCT/EP2018/055748
§ 371 (c)(1),
(2) Date: Sep. 9, 2019

(87) PCT Pub. No.: WO2018/162637
PCT Pub. Date: Sep. 13, 2018

(65) Prior Publication Data
US 2020/0361163 A1 Nov. 19, 2020

(30) Foreign Application Priority Data

Mar. 9, 2017 (DE) ..................... 10 2017 203 939.6

(51) Int. Cl.
*B29C 70/38* (2006.01)
*B25J 15/06* (2006.01)
*B29C 31/08* (2006.01)

(52) U.S. Cl.
CPC ........... *B29C 70/38* (2013.01); *B25J 15/0625* (2013.01); *B25J 15/0658* (2013.01); *B25J 15/0691* (2013.01); *B29C 31/08* (2013.01)

(58) Field of Classification Search
CPC ..... B29C 70/38; B29C 70/382; B29C 70/384; B29C 70/386; B29C 70/388; B29C 31/08;
(Continued)

(56) References Cited

U.S. PATENT DOCUMENTS 8,556,617 B2   10/2013   Reinhold et al.
2014/0062112 A1   3/2014   Cho
(Continued)

FOREIGN PATENT DOCUMENTS

DE   20 2009 014 155   10/2009
DE   10 2008 032 574   1/2010
(Continued)

OTHER PUBLICATIONS

Translation of Jp H10-167470 A, Inventors Kiyoyuki Horii, Yoshiichi Ishii, published 1998-06-23 (Year: 1998).*
(Continued)

*Primary Examiner* — George R Koch
(74) *Attorney, Agent, or Firm* — Rankin, Hill & Clark LLP

(57) ABSTRACT

Laying die includes an attaching element having an inlet port for receiving positively pressurized gas; and a carrier body made from an elastically deformable material and attached on a lower side of the attaching element. The carrier body includes passages enabling a gas flow between the attaching element and the lower side of the carrier body opposed to the attaching element. The attaching element houses a flow path arranged to receive pressurized gas from the inlet port and a longitudinal pathway extending from the lower side of the attaching element towards an upper side of the attaching element. The flow path discharges into the longitudinal pathway at a junction section, which is arranged such that pressurized gas discharging into the longitudinal pathway creates a negative pressure and comprises a curved deflection surface curved towards the upper side of the attaching element.

11 Claims, 3 Drawing Sheets

Figure 1:
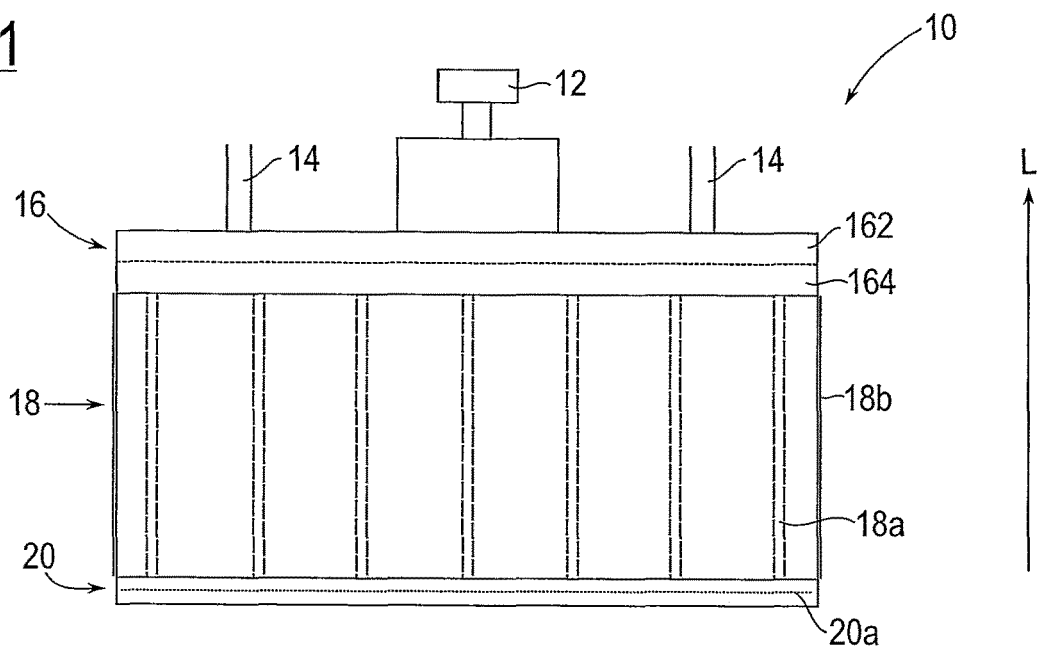

(58) Field of Classification Search
CPC . B25J 15/0625; B25J 15/0658; B25J 15/0691
See application file for complete search history.

(56) References Cited

U.S. PATENT DOCUMENTS

2014/0090528 A1    4/2014  Graf
2020/0039092 A1*   2/2020  Reinhold ............. B25J 15/0616

FOREIGN PATENT DOCUMENTS

| DE | 10 2011 076 152 | 11/2012 |
|---|---|---|
| DE | 10 2014 213 475 | 1/2016 |
| DE | 10 2015 200 503 | 7/2016 |
| EP | 2 796 263 | 10/2014 |
| JP | H10 167470 | 6/1998 |

OTHER PUBLICATIONS

Written Opinion and International Search Report of PCT/EP2018/055748 dated Jun. 6, 2018, 8 pages.
German Search Report of Serial No. 10 2017 203 939.6, dated Sep. 19, 2017, 8 pages.

* cited by examiner

LAYING DIE

This application is a 371 of PCT/EP2018/055748, filing date Mar. 08, 2018.

The present invention relates to a laying die for picking up and laying of substrates by means of pressurized gas, comprising an attaching element having an upper side and a lower side and comprising an inlet port for receiving positively pressurized gas and an outlet port, and a carrier body made from an elastically deformable material and attached on the lower side of the attaching element, wherein the carrier body comprises a plurality of passages enabling a gas flow between the attaching element and the lower side of the carrier body opposed to the attaching element.

A laying die of this type has been used in manufacturing components made from fiber composite structures and in particular load path aligned fiber composite structures. In these materials, high-strength fibers are embedded in a matrix of plastic or resin material such that they are aligned with the expected direction of the load acting on the component when in use. Thus, the resulting structures are anisotropic concerning their mechanical properties yet in use cases with well-defined load directions, a weight reduction of 25% to 50% compared with aluminium or steel structures of the same strength can be achieved.

In order to manufacture such components made from said composite structures in high numbers with high quality and low costs, modern and highly automated manufacturing processes and techniques are being developed. The manufacturing process with the highest potential for automation and the lowest cycle time is commonly referred to as the preforming infiltration process. Therein, the carbon fibers destined to carry the majority of the load in the finalized component are pre-formed into their three-dimensional shape and subsequently impregnated with the liquid plastic or resin material and cured. Said second process step is commonly referred to infiltration or injection.

For the automated laying of the fiber substrates on complexly shaped forming tools with the correct orientation of the fibers, the fiber patch placement process has been developed. Therein, the pre-formed fibers which have been treated with a binder material are positioned on a preforming tool using pressure and heat in order to reduce the viscosity of the binder. In this way, a pre-form is being constructed from relatively small pieces by successively positioning multiple of said patches in dedicated positions with a given orientation of their fibers. It is the use of said patches and the employment of a patch laying die which is able to passively adjust to the surface shape of the tool which enables the automated manufacturing of the pre-forms. Said laying die is responsible for picking up, transporting, heating, checking and positioning the patches on the tool.

Laying dies which are able to perform said tasks are for example known from EP 2 796 263 A2. Said document discloses a laying die for picking up and laying of substrates comprising an elastically deformable substrate receiving structure and an attaching element comprising a gas channel for providing positively or negatively pressurized gas for picking up and blowing off the substrates, as well as a carrier body made from an elastically deformable material. Said known laying die relies on negatively pressurized gas for picking up the substrate patch and positively pressurized gas for blowing it off.

In order to provide a sufficient flow of negatively pressurized gas, large vacuum pumps are required which have to be positioned outside the laying die and the negative pressure has to be transported via a system of gas pipes to the laying die itself. Said negatively pressurized gas flow by design can only provide a pressure difference of 1 bar compared to the atmosphere and requires a relatively high pipe diameter at a given pipe length in order to provide a sufficient gas mass flow rate. Due to the large vacuum pump and extensive piping required in the laying die of EP 2 796 263 A2 a bottleneck concerning possible cycle times of the substrate laying process may be created due to the high inertia of the die. Also, alternatingly providing negatively and positively pressurized gas in the same piping structure has a relatively high inertia in itself and therefore further slows the possible cycle times of the known laying dies.

Therefore, it is the object of the invention to remedy at least some of the shortcomings of known laying dies by reducing the weight and the size of the system responsible for providing the negatively pressurized gas for the picking up of the substrates in such dies.

In order to achieve said object, the laying die according to the invention is characterized in that the attaching element houses a flow path arranged to receive pressurized gas from the inlet port and a longitudinal pathway extending from the lower side of the attaching element towards the upper side of the attaching element, wherein the flow path discharges into the longitudinal pathway at a junction section and the junction section is arranged such that pressurized gas discharging into the longitudinal pathway creates a negative pressure in the longitudinal pathway on the lower side of the attaching element and comprises a curved deflection surface curved towards the upper side of the attaching element.

It is the achievement of the inventors to have realized that it is beneficial to create the negative pressure not externally from the laying die but in the attaching element of the laying die itself. As opposed to the maximum possible pressure difference of 1 bar when supplying negatively pressurized gas to the laying die as mentioned above, positively pressurized gas can be delivered with common technical gas supply means at a positive pressure of about at least 8 to 10 bar such that positively pressurized gas can be transported further and quicker. Said higher pressure difference can also yield smaller required diameters for the piping system since due to the higher pressure difference an increased gas mass flow rate can be achieved. Also, since the need for alternatively providing negatively and positively pressurized gas is eliminated, the inertia of the gas supply system in use is also reduced.

Said increased speed in the supplying of the laying die with pressurized gas as well as lower weight of the device enable a higher level of integration of the laying die concerning the use of extremely fast robotic components for translating the die resulting in shorter cycle times in the pre-form production process and larger possible sizes of the laying die.

The solution according to the invention presented above relies on the so-called Coanda effect according to which a positively pressurized gas flow will follow the shape of curved surfaces it passes along as long as certain boundary conditions are fulfilled, such as a pressure dependent maximum curvature of the surface which may not be exceeded. Said conditions for creating the Coanda effect are well known in the literature and can be verified by experimentation. Using the Coanda effect, only low negative pressure differentials can be achieved at high mass flow rates. While this feature may be considered disadvantageous for vacuum generation in most applications, it is the achievement of the inventors to realize that in the present application due to the deformable carrier body which is compressed already at low pressure differentials providing an excellent sealing effect, the pressure differential created due to the Coanda effect is sufficient to reliably pick up and transport the fiber patches. Furthermore, in the known dies described above, the low pressure differential required to pick up the substrates has a further negative impact on the possible length of the gas supply pipes at a given effective diameter, since the maximum possible pressure differential of 1 bar when using negative pressure may not even be available.

By thus deflecting the positively pressurized gas flow towards the upper side of the attaching element, a negative pressure is created on the lower side of the attaching element which is used to draw in and pick up substrate patches. The actual design of the interior of the attaching element in which the negative pressure is created may vary in practice, for example multiple flow paths and/or pathways and/or multiple inlet ports can be provided as long as the pathways open on the lower side of the attaching element for the desired suction effect and the pressurized gas is led out towards upper side of the attaching element due to the Coanda effect.

The additional components of the laying die apart from the attaching element in which the negative pressure for picking up the substrate patches is created can be constructed similarly to laying dies known in the art, for example an elastically deformable substrate receiving structure may be attached to the lower side of the carrier body opposed to the attaching element and also an elastically deformable substrate receiving structure as well as heating elements for heating a binder material with which the substrates have been treated can be provided. Furthermore, suitable means for attaching the laying die to an actuating assembly translating and rotating the die relative to the preforming tool can be provided, for example on the upper side of the attaching element.

In a preferred embodiment, a single junction section can be provided which constitutes the only orifice in the circumferential wall of the longitudinal pathway. In the case that multiple longitudinal pathways are provided in the attaching element, a single junction section can be provided for some or all of them. By providing a single orifice in the circumferential wall of the longitudinal pathway, pressure losses can be minimized and thus the suction power of the laying die can be maximized. As long as the curved deflection surface responsible for deflecting the pressurized gas upwards according to the Coanda effect is provided, the junction section may have different shapes, for example can run around the entire circumference of the longitudinal pathway by means of which the suction effect can also be increased.

Furthermore, the attaching element may comprise an upper part and a lower part which a sealingly joined, wherein the flow path and/or the longitudinal pathway and/or the junction section is/are at least partially formed by matching recesses in the upper and lower parts. Such attaching elements can be produced with a milling or cutting technique which allows for a high precision as well as low costs in their production. Alternatively, the attaching element may also be formed from a single piece or multiple components, wherein in case of said single piece the flow path as well as the longitudinal pathway and the junction section may be drilled into it.

It may be beneficial if the circumferential wall of the longitudinal pathway has a substantially circular cross section at least in sections along its longitudinal extension. Providing the longitudinal pathway with a circular cross section increases the symmetry of the gas flow and may therefore lead to a more even pressure distribution on the lower side of the attaching element. Of course, the longitudinal pathway could as well have another shape, for example it may be elliptical or rectangular and may have a cylindrical or conical shape when viewed in longitudinal section.

In order to maximize the suction effect due to the Coanda effect in the laying die according to the invention, it may be beneficial if the deflection surface extends around substantially the entire circumference of the longitudinal pathway. In order to supply such a deflection surface with pressurized gas, the flow path can furthermore be shaped accordingly, for example extending around the entire circumference of the longitudinal pathway as well.

In order to reduce the size of the laying die according to the invention it may be beneficial if both the inlet port and the outlet port are disposed on the upper side of the attaching element. However, if the actuating assembly to which the laying die is mounted when in use requires so, other arrangements of the inlet port and the outlet port may be employed as well.

In order to provide for a quick and reliable way of laying the substrates, the attaching element may further comprise a second longitudinal pathway which is arranged such that positively pressurized gas can be supplied to the lower side of the attaching element. By a supplying said second longitudinal pathway with positively pressurized gas, the substrate may be blown off or separated from the laying die quickly and precisely. Also, by providing separate longitudinal pathways for providing negative and positive pressure at the lower side of the attaching element respectively, which are nonetheless both operated with positively pressurized gas supplied to the attaching element, a reversal in the gas flow to the attaching element can be avoided, which decreases the inertia of the gas supply system in use.

In order to selectively supply the flow path and the second longitudinal pathway with positively pressurized gas, the laying die according to the invention may further comprise at least one controlled valve assembly in the flow path and the second longitudinal pathway may be arranged to be selectively supplied with pressurized gas from a single inlet port using said valve assembly. Alternatively, multiple inlet ports or controlled supply means could be employed such that the supply of pressurized gas to both the flow path and the second longitudinal pathway would be controlled from outside the die. While this may require additional piping, not providing a control valve assembly in the die itself reduces both the required space as well as the weight of the laying die.

In a possible embodiment of the invention, the attaching element of the laying die according to the invention may comprise two modules, each comprising at least one flow path, at least one longitudinal pathway and, if applicable, at least one second longitudinal pathway, wherein each module is individually sealed. In another possible embodiment, only some of the modules comprise a second longitudinal pathway. The configuration with multiple modules may be especially beneficial for a larger die for picking up larger substrate patches, and the modules may be arranged on the die for example in 1×2 or 2×3 configurations in order to cover larger areas in a suitable manner. The individual modules may be provided with individual or common supply means for pressurized gas and individual or common controlled valves.

In order to guarantee an optimal flow of the negatively pressurized gas from the upper side of the carrier body to the lower side of the carrier body while the substrate is actually received when in use, at least one outer surface of the carrier body and/or at least one wall surface of the passages may be coated in a gas-tight manner. Said coating can for example be made from a gas-tight foil, a suitable varnish or generally speaking any kind of coating which decreases the permeability of the surface in question. In order to ensure a sufficient negative pressure on the lower side of the carrier body, as many of the surfaces cited above as possible or as necessary may be coated.

Furthermore, in order to evenly distribute the negative pressure between the plurality of passages in the carrier body, the lower side of the attaching element may comprise an outer section defining its circumference and arranged to permit gas-tight attachment of the carrier body thereto and a central section recessed towards the upper side of the attaching element. By providing the recessed central section, a cavity above the carrier body is formed in the attaching element in order equalize the negative pressure over the plurality of passages in the carrier body. In order to prevent the carrier body from collapsing into said cavity when a substrate is picked up and the negative pressure pulls the carrier body towards the attaching element as no gas flow is possible any longer through the plurality of passages, one or more additional contact points or areas for the carrier body may be provided in the central section which preferably are aligned with the level of the outer section.

The present invention also relates to a laying assembly for picking up and laying of substrates, comprising a lying die according to the invention as well as a gas supplying means for supplying positively pressurized gas.

It further relates to a laying device for picking up and laying of substrates, comprising a laying assembly according to the invention, an actuating assembly for translating and rotating the laying die and a control unit for controlling the actuating assembly as well as the gas supply means.

Said translation and rotation of the laying die performed by the actuating assembly and controlled by the control unit may be along arbitrary degrees of freedom and in use of the device serves for translating the laying die between a position in which it picks up substrates and a position in which it lays the substrates. The control unit may be embodied by or may comprise known suitable means for said purpose, such as computers and microcontrollers, and it may also be coupled to further control units controlling other aspects of the composite structure manufacturing process in order to integrate the laying die according to the invention into an integrated and automated manufacturing environment.

Figure 2:
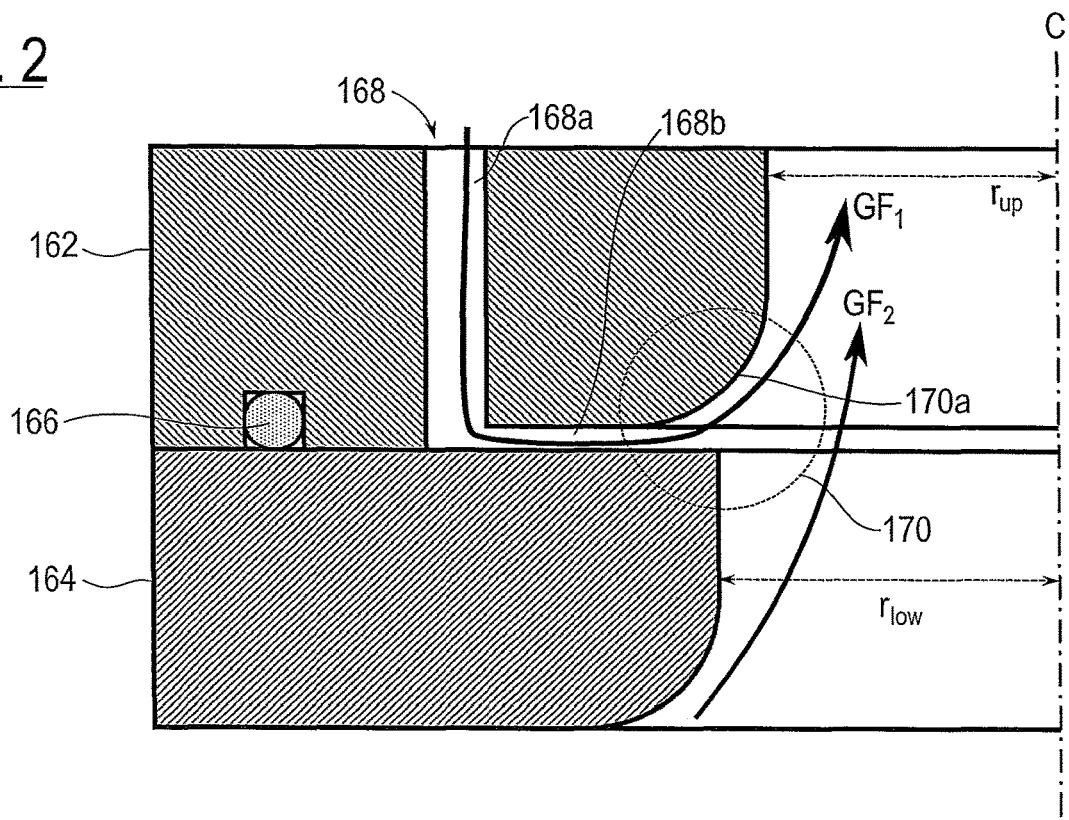
Figure 3A:
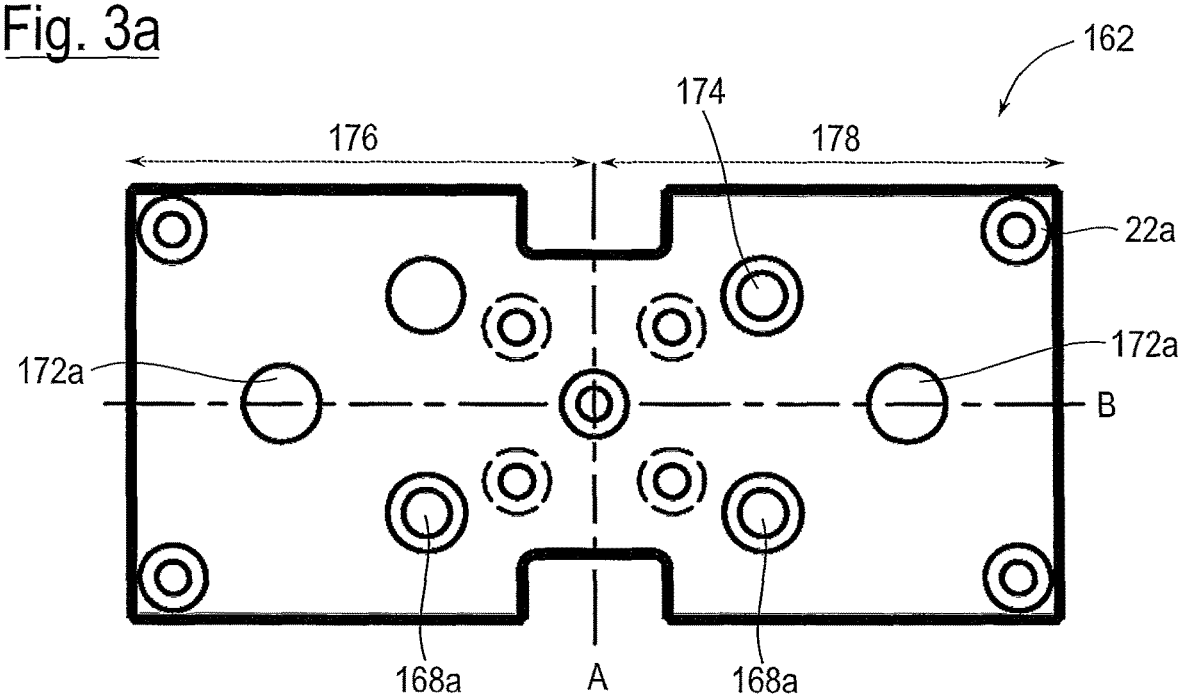
Figure 3B:
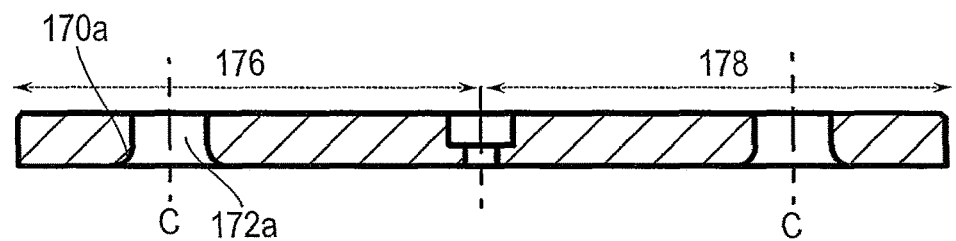
Figure 4A:
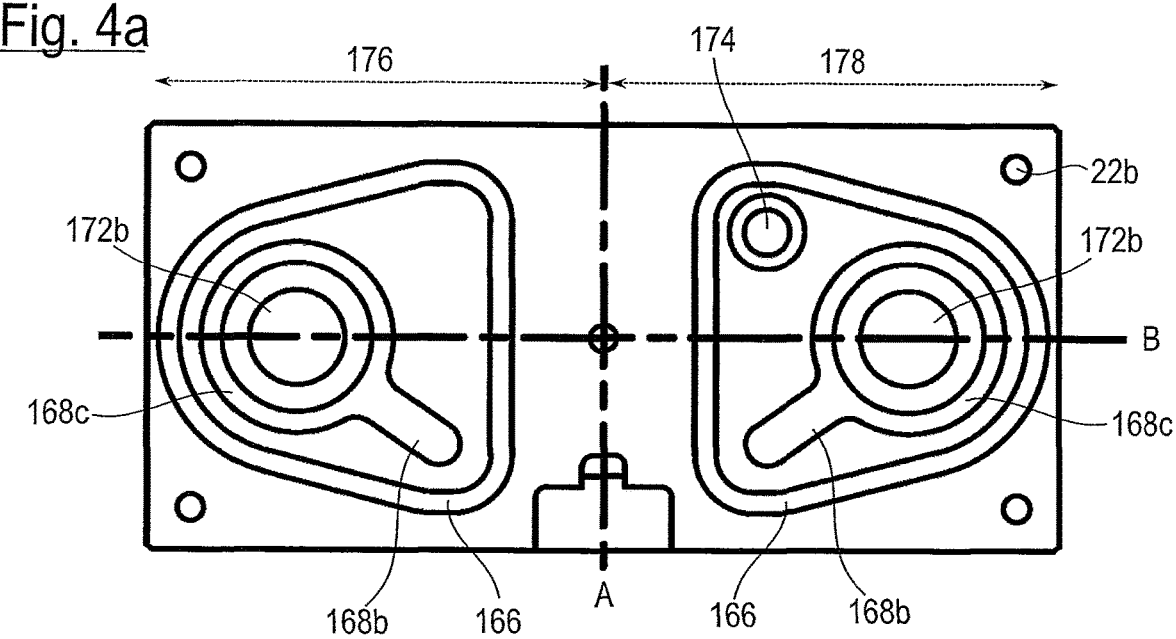

Additional advantages and features of the present invention may be understood from the description below when considered together with the enclosed figures. Said figures show:

FIG. 1 a laying die according to the invention in schematic section view;

FIG. 2 the attaching element of the laying die of FIG. 1 in schematic section view;

FIGS. 3a and 3b the upper part of the attaching element of FIGS. 1 and 2 in view from above and in section; and FIGS. 4a to 4c the lower part of the attaching element of FIGS. 1 and 2 in view from above, in section and from below.

In FIG. 1 a laying die for substrates is shown in schematic section view and generally denoted with the reference numeral 10. Furthermore, a longitudinal direction is identified by arrow L. When in use, the laying die 10 of FIG. 1 is connected to a an actuating assembly (not shown) responsible for translating and rotating it via a connecting element 12 provided on the upper side of the laying die 10, wherein the connecting element 12 is in particular connectable to a suitable counter-element provided at the actuating assembly. Also provided on the upper side of the laying die 10 are two supply pipes 14, through which positively pressurized gas is supplied to the laying die 10 from external gas supply means.

The connecting element 12 is connected on its lower end to an attaching element 16. Said attaching element 16 is formed by an upper part 162 and a lower part 164, which are fixedly connected. For a detailed description of the attaching element 16 it is referred to FIGS. 2 to 4c while in FIG. 1 it is shown only in a schematic manner. The supply pipes 14 are also connected to the connecting element 16, for which purpose inlet ports 168a are provided in the connecting element 16, which will be described below with reference to FIGS. 2 and 3a.

On the lower side of the attaching element 16 and in particular its lower part 164, a carrier body 18 made from an elastically deformable material is attached in a gastight manner. The carrier body 18 may be of the type known from EP 2 796 263 A2 and may in particular be formed from a foamed material such as polyurethane foam. The carrier body 18 comprises a plurality of passages 18a extending substantially along the longitudinal direction L and connecting the lower side of the carrier body 18 with the upper side of the carrier body 18 and thus the lower side of the attaching element 16. Furthermore, the external side surfaces of the carrier body 18 are sealed or coated with a gastight material 18b such as a gastight foil or a gastight varnish. The wall surfaces of the passages 18a may be coated in a similar manner as the external side surfaces.

On the lower of the carrier body 18, a substrate receiving structure 20 is attached which is also made from an elastically deformable material and may also be from the type known from EP 2 796 263 A2 housing a heating element 20a and being arranged to receive the substrate to be carried by the laying die 10 on its lower face.

In use of the laying die 10, a negative pressure is produced at the lower side of the attaching element 16 which is transported through the passages 18a formed in the carrier body 18 to the substrate receiving structure 20. The negative pressure provided at the lower face of the substrate receiving structure 20 allows for picking up and transporting substrate patches. Due to them being elastically deformable, both the carrier body 18 and the substrate receiving structure 20 will bend following the shape of the substrate once it is received on the lower face of the substrate receiving structure 20 in a gastight manner or following the shape of the tool on which the substrate is to be placed.

FIG. 2 now shows a portion of the attaching element 16 of the laying die of FIG. 1 in schematic section view. As mentioned above, it comprises an upper part 162 and a lower part 164, which are fixedly connected. Between the two parts 162 and 164, a sealing element 166 made from a rubber material is provided in order to seal the inner cavities of the attaching element 16 which are described below from the outside in a gastight manner.

In the upper part 162 of the attaching element 16, a gas flow path 168 is formed, consisting of a longitudinally extending section 168a which also serves as the inlet port for positively pressurized gas mentioned above and is connected to the gas supply pipe 14 for receiving said positively pressurized gas. The longitudinally extending section 168a extends from the upper side of the upper part 162 to the boundary surface between the upper part 162 and the lower part 164. At said boundary surface, the gas flow path turns by 90° passing over to a horizontally extending section

168b. Said horizontally extending section 168b is also formed in the upper part 162 of the attaching element 16, for example by milling.

The horizontally extending section 168b of the gas flow path 168 at a junction section 170 discharges into a longitudinal pathway 172, which extends from the lower side of the attaching element 16 to its upper side and is formed in an aligned manner in both the upper part 162 and the lower part 164 thus consisting of an upper pathway 172a and a lower pathway 172b. Dashed line C in FIG. 2 represents the center line of the longitudinal pathway 172. In the junction section 170, a curved deflection surface 170a is formed which is curved towards the upper side of the attaching element 16. While both the upper pathway 172a and the lower pathway 172b have circular cross sections, the deflection surface 170a as well as the circumferential walls of the longitudinal pathway 172 are shaped such that the radius $r_{up}$ of the upper pathway 172a is slightly smaller than the radius $r_{low}$ of the lower pathway 172b.

The arrows $GF_1$ and $GF_2$ illustrate the gas flow inside the attaching element 16 when the laying die 10 is in use and positively pressurized gas is supplied through the gas supply pipe 14 to the inlet port 168a. The gas flows through the gas flow path 168 following firstly the sections 168a and 168b and discharging into the longitudinal pathway 172 at the junction section 170. Due to the Coanda effect according to which a positively pressurized gas flow will follow the shape of curved surfaces it passes along, it is deflected towards the upper side of the attaching element 16 by the deflection surface 170a in the junction section 170. During its upwards motion into the upper pathway 172a, the gas flow $GF_1$ draws in gas from the lower pathway 172b thus evoking the second gas flow $GF_2$ which is also directed towards the upper side of the attaching element 16. Thus, a pressure differential is created in the longitudinal pathway 172 and at the lower side of the attaching element, the negative pressure for operating the laying die 10 for picking up a substrate is produced. The positively pressurized gas flowing in the upper pathway 172a towards the upper side of the attaching element 16 may be led away by additional gas outlet pipes or simply discharged into the environment, both through an outlet port (not shown).

FIGS. 3a and 3b now show the upper part 162 of the attaching element 16 of FIGS. 1 and 2 in view from above and in section. In its four corners, bore holes 22a are provided through which connecting elements such as screws or bolts for connecting the upper and lower parts 162 and 164 of the attaching element 16 can be inserted.

It can also be seen that the upper part 162 is substantially symmetrical with respect to an axis A which divides it into two halves each of which forms an individual module comprising a flow path 168, a longitudinal pathway 172 and, in the case of the right module, a second longitudinal pathway 174. In the view from above of FIG. 3A, the inlet ports 168a of the flow path 168 and the upper pathway 172a of the longitudinal pathway 172 are shown. The two modules are denoted by reference numerals 176 and 178 and individually sealed as will be shown in FIG. 4a.

The second longitudinal pathway 174 extends from the upper side to the lower side of the attaching element 16 in an aligned manner through both its upper part 162 and its lower part 164 following the longitudinal direction L and is arranged such that positively pressurized gas can be supplied to the lower side of the attaching element for blowing off the substrate from the substrate receiving structure 20. As the blowing off of the substrate is decidedly easier than its picking up since it is aided by the weight of the substrate, the single longitudinal pathway 174 provided in the right module 178 is sufficient for that purpose.

FIG. 3b, which is a section view through the center line B shown in FIG. 3a, further shows that the two circular upper pathways 172a of the two modules 176 and 178 extend in parallel with their respective deflection surfaces 170a extending around their entire circumference. In order to distribute the positively pressurized gas around the circumference to the longitudinal pathway 172, circumferential sections 168c of the gas flow path 168 are provided which lead the pressurized gas coming from the horizontal section 168b around the circumference of the longitudinal pathway 172 such that the junction section 170 also has a circular shape. Said circumferential sections 168c of the gas flow path 168 are shown in FIG. 4a.

Figure 4B:
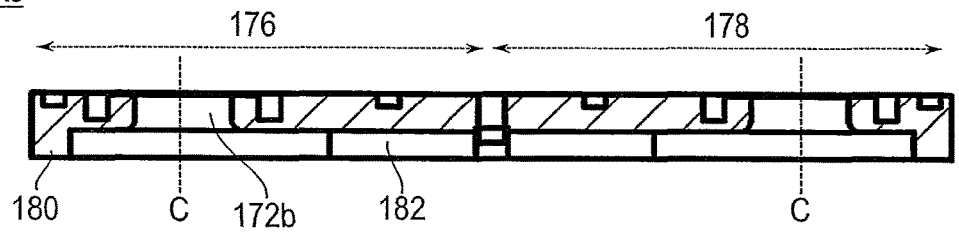
Figure 4C:
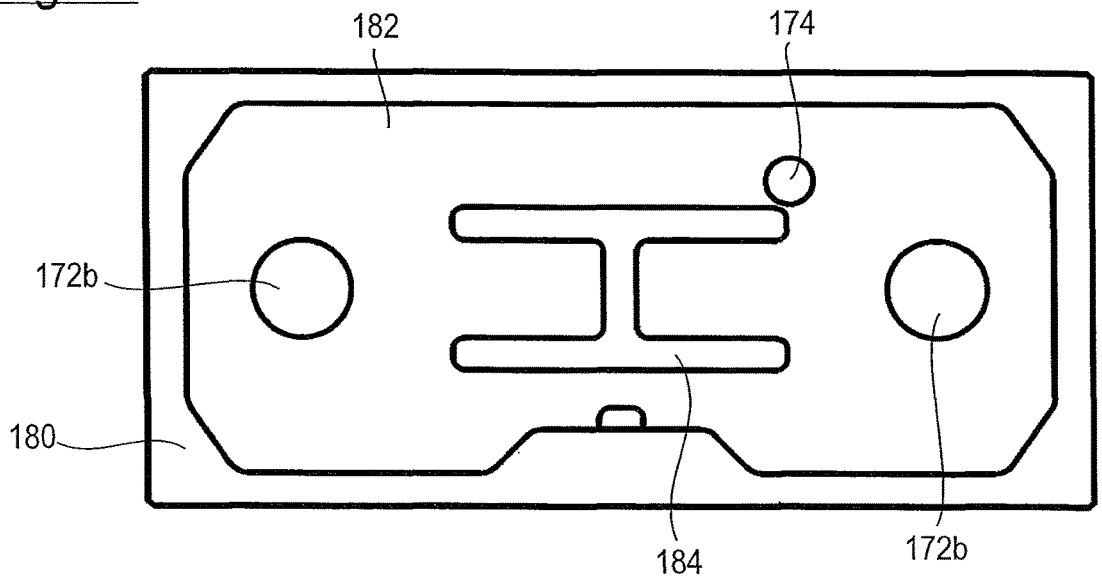

Said FIG. 4a as well as FIGS. 4b and 4c shown the lower part 164 of the attaching element of FIGS. 1 and 2 in view from above, in section and from below. The lower part also comprises bore holes 22b in its four corners, through which the above mentioned connecting elements for connecting the upper and lower parts 162 and 164 of the attaching element 16 can be inserted.

Like the upper part 162, the lower part 164 of the attaching element 16 is symmetric with respect to the axis A forming two modules 176 and 178. Each of the modules 176 and 178 comprises an individual sealing element 166 thus sealing the cavities of both modules 176 and 178 formed between the upper part 162 and the lower part 164 individually. In the view from above of FIG. 4a, the horizontal and circumferential sections 168b and 168c of the gas flow path 168 as well as the lower passageway 172b and the second passageway 174 are shown.

In FIG. 4b which is a section through the lower element 164 along the center line B similar to FIG. 3b, it can be seen that the lower element 164 on its lower side comprises an outer section 180 defining its circumference and arranged to permit gastight attachment of the carrier body 18 thereto and a central section 182 recessed towards the upper side of the attaching element. The gas flow into the lower passageway 172b due to the created negative pressure is thus distributed in the central section 182 leading to a uniform negative pressure over a large area of the lower side of the attaching element 16 which leads to an even gas flow in the multiple passages of the carrier body 18 and an optimal suction effect at the substrate receiving structure 20 shown in FIG. 1.

As can be further seen in the view from below of FIG. 4c, in the central section 182 a further contact area 184 for the carrier body is provided in the form of the letter "H", which prevents the carrier body 18 from collapsing into the central section 182 when a substrate is picked up and the negative pressure pulls the carrier body 18 towards the attaching element 16.

The invention claimed is:

1. Laying die for picking up and laying of substrates via pressurized gas, comprising:
    an attaching element having an upper side and a lower side and comprising an inlet port for receiving positively pressurized gas and an outlet port; and
    a carrier body made from an elastically deformable material and attached on the lower side of the attaching element;
    wherein the carrier body comprises a plurality of passages enabling a gas flow between the attaching element and the lower side of the carrier body opposed to the attaching element;
    wherein the attaching element houses a flow path arranged to receive pressurized gas from the inlet port and a longitudinal pathway extending from the lower side of the attaching element towards the upper side of the attaching element;

wherein the flow path discharges into the longitudinal pathway at a junction section;

wherein the junction section is arranged such that pressurized gas discharging into the longitudinal pathway creates a negative pressure in the longitudinal pathway on the lower side of the attaching element and comprises a curved deflection surface curved towards the upper side of the attaching element wherein a single junction section is provided which constitutes the only orifice in the circumferential wall of the longitudinal pathway; and wherein both the inlet port and the outlet port are disposed on the upper side of the attaching element.

2. Laying die according to claim 1, wherein the attaching element comprises an upper part and a lower part which are sealingly joined, wherein the flow path and/or the longitudinal pathway and/or the junction section is/are at least partially formed by matching recesses in the upper and lower parts.

3. Laying die according to claim 1, wherein the circumferential wall of the longitudinal pathway has a substantially circular cross section at least in sections.

4. Laying die according to claim 1, wherein the deflection surface extends around substantially the entire circumference of the longitudinal pathway.

5. Laying die according to claim 1, wherein the attaching element further comprises a second longitudinal pathway which is arranged such that positively pressurized gas can be supplied to the lower side of the attaching element.

6. Laying die according to claim 5, further comprising at least one controlled valve assembly and the flow path and the second longitudinal pathway are arranged to be selectively supplied with pressurized gas from a single inlet port using said valve assembly.

7. Laying die according to claim 1, wherein the attaching element comprises at least two modules each comprising at least one flow path, at least one longitudinal pathway and, optionally, at least one second longitudinal pathway, wherein each module is individually sealed.

8. Laying die according to claim 1, wherein at least one outer surface of the carrier body and/or at least one wall surface of the passages is coated in a gastight manner.

9. Laying die according to claim 1, wherein the lower side of the attaching element comprises an outer section defining its circumference and arranged to permit gastight attachment of the carrier body thereto and a central section recessed towards the upper side of the attaching element.

10. Laying assembly for picking up and laying of substrates, comprising a laying die and a gas supply means for supplying positively pressurized gas, wherein the laying die includes:

an attaching element having an upper side and a lower side and comprising an inlet port for receiving positively pressurized gas and an outlet port; and a carrier body made from an elastically deformable material and attached on the lower side of the attaching element;

wherein the carrier body comprises a plurality of passages enabling a gas flow between the attaching element and the lowerside of the carrier body opposed to the attaching element;

wherein the attaching element houses a flow path arranged to receive pressurized gas from the inlet port and a longitudinal pathway extending from the lower side of the attaching element towards the upper side of the attaching element;

wherein the flow path discharges into the longitudinal pathway at a junction section;

wherein the junction section is arranged such that pressurized gas discharging into the longitudinal pathway creates a negative pressure in the longitudinal pathway on the lower side of the attaching element and comprises a curved deflection surface curved towards the upper side of the attaching element wherein a single junction section is provided which constitutes the only orifice in the circumferential wall of the longitudinal pathway; and wherein both the inlet port and the outlet port are disposed on the upper side of the attaching element.

11. Laying device for picking up and laying of substrates, comprising a laying assembly according to claim 10, an actuating assembly for translating and rotating the laying die and a control unit for controlling the actuating assembly and the gas supply means.

* * * * *